United States Patent
Yan (10) Patent No.: US 12,297,814 B2
(45) Date of Patent: May 13, 2025

(54) COMPRESSED AIR PIPELINE POWER GENERATION DEVICE

(71) Applicant: Talos Industry Corporation, Marborough, MA (US)

(72) Inventor: Qiang Yan, Halethorpe, MD (US)

(*) Notice: Subject to any disclaimer, the term of this patent is extended or adjusted under 35 U.S.C. 154(b) by 52 days.

(21) Appl. No.: 18/060,562

(22) Filed: Nov. 30, 2022

(65) Prior Publication Data
US 2023/0193877 A1    Jun. 22, 2023

(30) Foreign Application Priority Data
Dec. 16, 2021 (CN) .......................... 202111565839.6

(51) Int. Cl.
  *F03D 9/25*  (2016.01)
  *F03D 9/12*  (2016.01)
  *F03D 9/17*  (2016.01)

(52) U.S. Cl.
  CPC .............. *F03D 9/25* (2016.05); *F03D 9/12* (2016.05); *F03D 9/17* (2016.05)

(58) Field of Classification Search
  CPC ..... F03D 9/25; F03D 9/12; F03D 9/17; F03D 1/025; F03D 1/04; F01D 15/10; F01D 9/02; F01D 13/02; F05D 2220/76; Y02E 10/72; Y02E 70/30
  See application file for complete search history.

(56) References Cited

U.S. PATENT DOCUMENTS

| 11,428,210 B1* | 8/2022 | Can | F03D 15/00 |
| 2015/0137521 A1* | 5/2015 | Obadan | F03D 9/25 290/52 |
| 2019/0376490 A1* | 12/2019 | Pickett | F03D 9/28 |

* cited by examiner

*Primary Examiner* — Joseph Ortega
(74) *Attorney, Agent, or Firm* — Mei & Mark LLP; Manni Li (57) ABSTRACT

The device of the present invention converts the kinetic energy of compressed air into electrical energy by setting up (N+1)-level wind turbines with same diameter but different rated power and rated speed in a pipeline and passing the high-speed airflow through the multi-levels of the wind turbine to reduce the airflow speed. The device converts wind energy into electrical energy and mixes atomized water when the compressed air flows through the wind turbines to improve the power generation efficiency. The device is a pipeline power generation device and a dedicated compressed air turbine. The pipeline power generation device can be used by multiple devices in parallel connecting with each other to increase the total power of peak-shaving power. As the result, the cost of the peak shaving power is reduced.

7 Claims, 5 Drawing Sheets

FIG. 1

A-A sectional view

FIG. 2

B-B Sectional view

COMPRESSED AIR PIPELINE POWER GENERATION DEVICE

CROSS-REFERENCE TO RELATED APPLICATIONS

The subject application claims priority on Chinese Application No. 202111565839.6 filed on Dec. 16, 2021 in China. The contents and subject matter of the Chinese priority application are incorporated herein by reference.

TECHNICAL FIELD

The present invention relates to energy storage and wind power generation.

BACKGROUND OF THE INVENTION

As the need for in-depth carbon emission increases, human beings increasingly need clean power, such as wind energy and solar power. However, clean power such as wind energy and solar power have the characteristics of uncertainty and large power fluctuation, and the grid power needs a relatively stable power supply, which creates a contradiction between supply and demand, resulting in a certain phenomenon of power abandonment. Therefore, clean power generally allocates peak-shaving power according to a certain proportion of clean power, such as thermal power generation, pumped storage, battery storage, and compression air storage. In the compressed air energy storage solution, when the grid needs electricity, the steam or gas turbine is used to generate electricity, the kinetic energy of the compressed air is converted into electricity for peak shaving. Even if the grid has certain capacity of peak shaving, due to the cost factor of peak shaving electricity, it will still generate certain amount of electricity waste and abandonment. Electricity is a special commodity and does not have the brand attributes of general commodities, and people needs cheap electricity. How to obtain at a lower cost of peak-shaving electricity using compressed air storage energy is the concern of the present invention.

The existing system that uses compressed air to storage energy and then power generation through a steam or gas turbine has a high cost of peak-shaving. The main cost is the high cost of the steam or gas turbine and lower efficiency. The essence of energy storage and peak regulation is the process of storing valley electricity and restoring the stored energy (kinetic energy, potential energy, etc.) into electricity during peak electricity consumption (wave peak). In the existing power generation devices that use compressed air energy storage, steam/gas turbines is generally used to generate power. The steam or gas turbine hasn't higher power generation efficiency, and the steam or gas turbine is not only expensive, but also requires high temperature and high pressure air to drive the steam or gas turbine to generate electricity. Additional fuel is required, so the cost of energy storage and peak-shaving cost is relatively high.

SUMMARY OF THE INVENTION

In the present invention, the compressed air is input from one end of the pipeline and flows out from the other end of the pipeline, and the high-speed airflow passes through the multi-stage wind turbine to generate electricity. The number of stages of wind turbines is N+1. N is a natural number greater than 1 and less than or equal to 8. Each wind turbine can be independently connected to the power grid. This power generation device is called a pipeline power generation device and is a dedicated compressed air turbine. This pipeline power generation device not only does not require additional fuel to generate high-temperature air, but also the power generation device has low cost, the result is that the peak shaving cost is also relatively low, which is worthy of large-scale promotion and application.

The present invention discloses a device that uses compressed air for energy storage during low power consumption, then passes the compressed air through a closed pipe (open at both ends) during peak power consumption, and sets up multi-stage wind turbines in the sealed pipe according to decreasing wind speed, and then reduces the kinetic energy of compressed air into electricity.

The device of the present invention is a device in which N+1 wind turbines with the same wind wheel diameter but with different rated power and rated speed are set in a closed pipe, and the compressed gas flows through the pipe to produce high-speed airflow, and the wind speed is reduced step by step through the multi-stage wind turbine, and finally the wind energy is converted into electricity, and the compressed gas is mixed with atomized water when flowing through the wind turbine in order to improve the efficiency of power generation. The device is called pipeline power generation device, and the pipeline power generation device can be used by multiple devices in parallel with each other to increase the total power of peaking power, and the invention is characterized by low peaking power cost.

BRIEF DESCRIPTION OF THE DRAWINGS

Reference numbers used in the figures refer to the following structures: 1—pipeline; 2—valve; 3—deflector; 4—wind turbine; 5—turbine blade; 6—generator; 7—support body; 8—diversion cover; 9—atomizing nozzle; 11—air tank; 14—outlet; 10—wind rotor; 12—single shaft; 13—shaft of the horizontal axis wind turbine; 16—inlet; 18—inner wall; L1—inner diameter; L2—maximum diameter of the diversion cover.

DETAILED DESCRIPTION OF THE INVENTION

The specific embodiments of the present invention will be described in further detail below in conjunction with specific embodiments. The setting of the level number of wind turbines, the method of setting the rated power and the rated speed of the wind turbines at all levels, the setting basis of the size of the diversion cover, and the setting method of the spray amount of atomized water are described in the details. But the present invention should not be limited by the description. It should be understood that those skilled in the art can change the pipe size in these embodiments, increase or decrease the number of wind turbine levels, and change the size of the diversion cover, without departing from the scope of the claims. Increasing or decreasing the number or position of water atomizing devices, and further refining the implementation, thereby generating new implementation methods, should also be included within the protection scope of the present invention.

Figure 1:
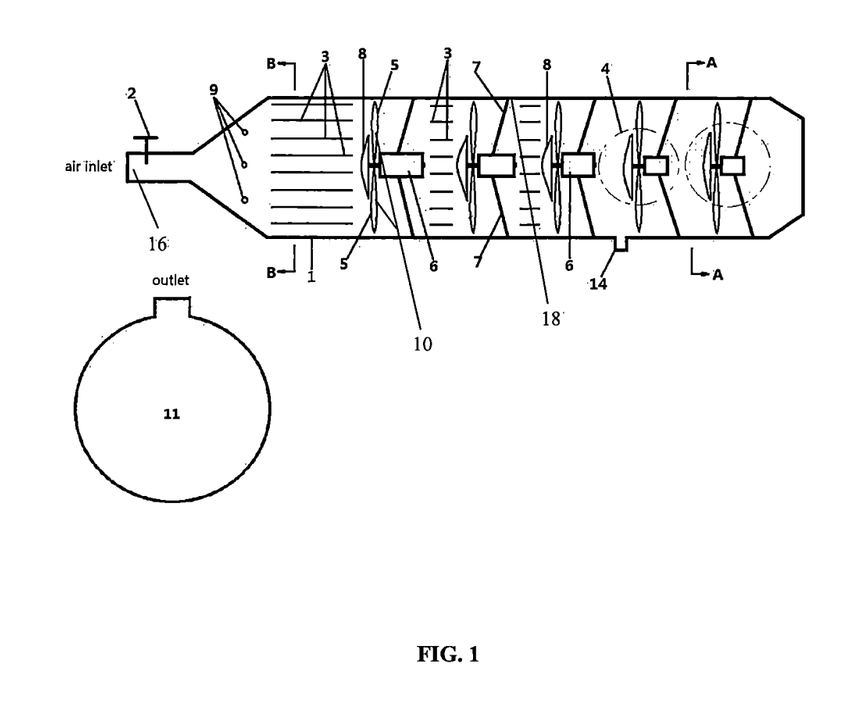
FIG. 1 shows the compressed air peak-shaving power generation device in one embodiment of the present invention.
Figure 2:
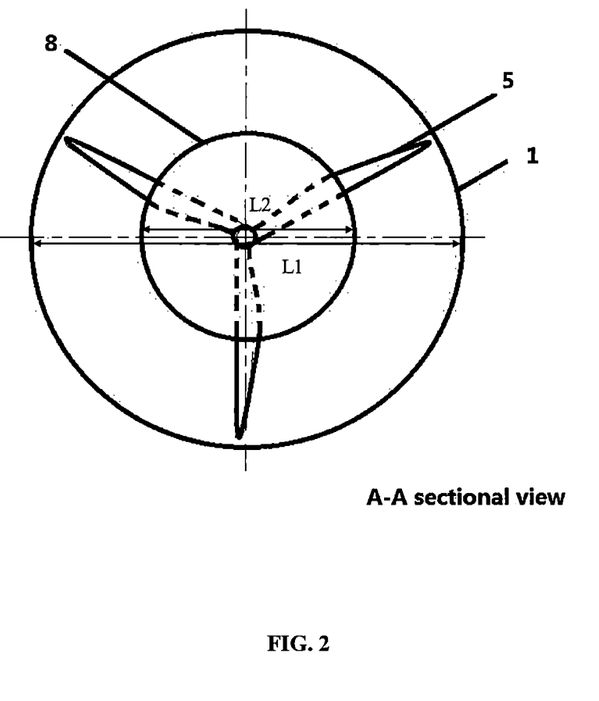
FIG. 2 shows the cross-sectional view of pipe "AA" of FIG. 1.
Figure 3:
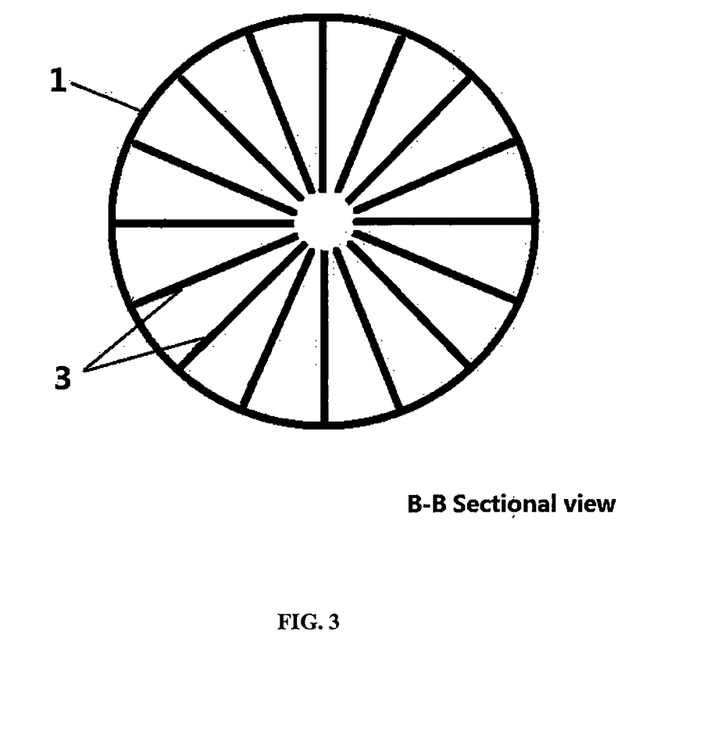
FIG. 3 shows the cross-sectional view of the pipe "BB" in FIG. 1.
Figure 4:
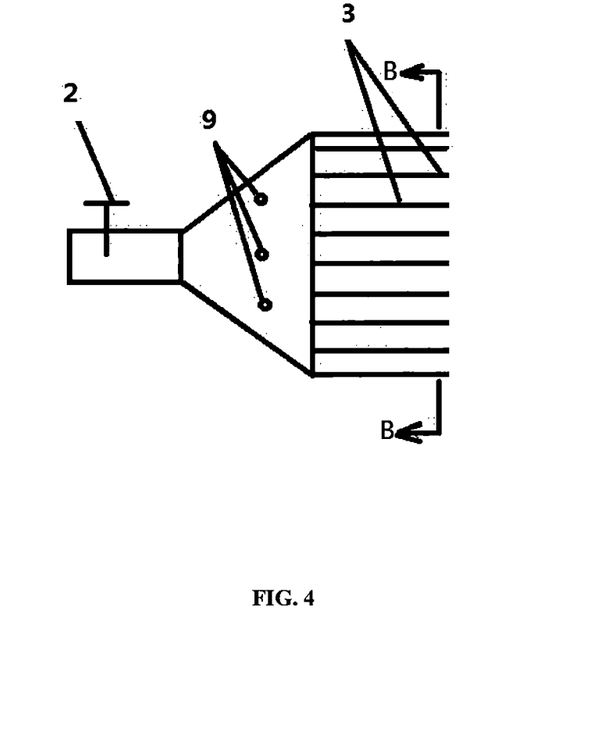
FIG. 4 shows the positions of the valve and the atomizing nozzle in the present invention.

In order to replace the steam or gas turbine to generate electricity in storage energy industry, the present invention adopts a circular pipeline 1 connected to the compressed air at one end, valve 2 is arranged at the inlet of the circular pipeline connected to the compressed air to control the input or closing of the compressed air. A number of nozzles for atomizing water are arranged behind the valve 9. Because the basic principles and formulas of wind energy conversion to electric energy are as follows: $P=(1/2)*1.225*\rho*S*V^3$, where P is the electrical power, 1.225 is the mass of air per cubic meter (kg) under standard conditions, p is the average wind/electrical conversion efficiency of a wind turbine, S is the effective swept area of the wind turbine, and V is the input The airflow velocity of the compressed gas can be seen from the above formula, increasing the air density or increasing p, S and V respectively can increase the power generation, while increasing the airflow velocity V, the power generation increases the fastest. The purpose of setting the atomizing water nozzle is to improve the quality of air per unit volume and increase power generation.

The entire peak shaving power generation system is composed of gas tank 11 and pipeline power generation device. After the compressed air enters the pipeline 1, it first mixes with the atomized water, and then passes through the air deflector 3 to adjust the compressed air in a spiral state into a smooth airflow to improve the efficiency of the wind turbine. (N+1) level wind turbines 4 with the same scavenging area but different rated power and rated speed of air are arranged behind the diversion cover 8, and several guides are also set between the former wind turbine and the latter wind turbine, for flowing air deflector 3 to smooth the turbulent airflow caused by the previous turbine.

Because the efficiency of a wind turbine rotor is the sum of the efficiencies of the blades, although in a wind turbine with one blade, the efficiency of a single blade is the highest, the efficiency of one blade equal to the efficiency of the turbine. Although in a two-blade turbine, the efficiency of the second blade is slightly affected by the turbulence generated by the first blade, resulting in a decrease in blade efficiency, the total efficiency of the turbine is the sum of the two blades, which is higher than that of using one blade. The same, the efficiency with three-blade turbine is also slightly higher than the two-blade turbine. Due to the low cost of blade in small wind turbine, the increase in the cost of the wind turbine caused by increasing the number of blades is very limited, so each wind turbine in the pipeline power generation device is composed at least three or more same blades. The wind turbines of pipeline are composed by blades 5, generator 6, support body 7, and diversion cover 8. The generator can be one of a permanent magnet synchronous generator or a doubly-fed asynchronous generator. Due to the different wind speeds and rotational speeds corresponding to wind turbines at all levels, the rated power and rated rotational speed of each generator are different. If a permanent magnet synchronous generator is used, the output of the generator is rectified and then input to the on grid inverter and merged into the grid; if a doubly-fed asynchronous generator is used, the generator is connected to the grid through the control device. Each wind turbine is independently connected to the grid.

If the gas is special gas, the outlet of pipeline 1 can be connected to the gas/water separation device, and then re-entered into the gas tank through the compressor for recycling.

Figure 5:
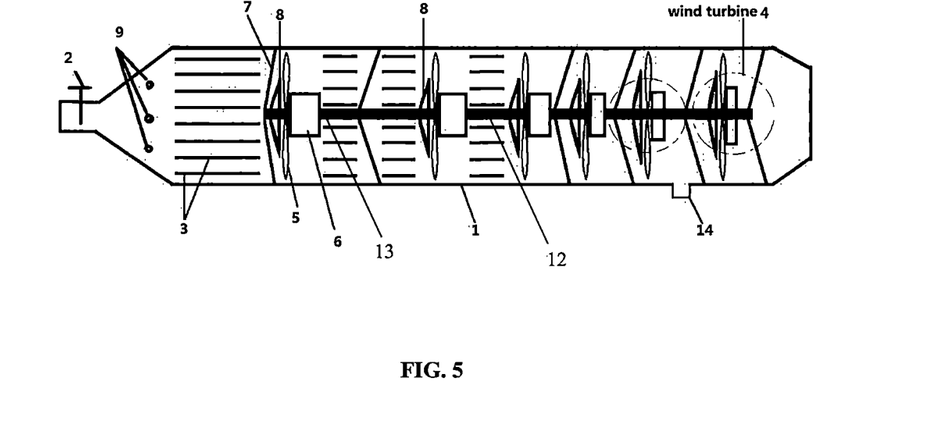
FIG. 5 shows the coaxial structure of the wind turbine in the present invention.

Since the power generation efficiency of the wind turbine is constrained by the "Blade Element Momentum Theory", the power generation efficiency of the blade tip part is higher, and the closer to the blade root (rotation center), the lower the efficiency, and the efficiency of the rotation center is zero. The diversion cover can not only constrain the airflow to the tip part of the blade to improve the power generation efficiency, but also increase the air flow speed. For example, when the diameter of the diversion cover is ½ of the diameter of the pipe, the effective air flow (wind) speed through the wind turbine can be increased by 25% due to the constant flow. Since the wind energy and wind speed are cubic relationship, the wind speed is doubled, then the wind energy is increased by 8 times. When the wind speed is increased to 1.25 times, the wind energy is increased by 1.95 times. Therefore, unlike in an open natural environment, in a closed pipe, the airflow is forced into the channel of the tip part of the blade, so that the air flowing speed through the blades of the wind rotor is proportionally increased, and the diversion cover can greatly increase the power generation of the wind turbine in the closed pipeline. However, the effect of the diversion cover to increase the power generation in a closed pipe is very different from an open natural environment. In an open natural environment, part of the airflow is blocked by the diversion cover and the wind turbine, and most of the airflow will bypass the wind turbine, which greatly reduces the effect of the diversion cover. In order to reduce the manufacturing cost, the blades can also be directly fixed on the diversion cover. In this case, the generator in the wind turbine is an inner rotor generator. If the wind turbines use external rotor generators, a plurality of shafts of the wind turbines at first-level to (N+1)-level can be connected to each other to form a single shaft, and at this time, the support bodies 7 of each wind turbine are connected to the single shaft.

In the following examples, the compressed air is supplied in unlimited quantities from the air tank, and the pressure of the compressed air is 20 MP or more.

Example 1

Example 1 shows the basic parameters in the present invention. In Example 1, the cross-sectional area of the inner wall of the pipeline is set to be 1 square meter and the length is several meters, a valve is set at the entrance of the pipeline, the flow of compressed air can be automatically controlled according to the needs, and a plurality of water atomizing nozzles are set at the back end of the valve. The compressed air valve is opened, and after the compressed air flows into the pipeline, the atomized water nozzles are automatically opened to form a spray. After the compressed air is rectified by the deflectors, a smooth airflow is generated. Assuming that the compressed air flow is 50.cubic meters per second, the smooth airflow speed after rectification is 50 m/s. The diameter of the diversion cover is selected to be ½ of the pipe diameter, the maximum area of the diversion cover is ¼ of the pipe cross-sectional area. At the maximum diameter of the diversion cover, the effective cross-sectional area of the pipe can be considered to be reduced to 0.75 square meters. Here, the effective area of the pipe is reduced by 25%, the air flow speed is increased by 25% to 62.5 m/s. In the blade element momentum theory, when the blade tip speed ratio (the ratio of blade linear speed to wind speed) reaches between 4 and 6, the power generation efficiency of the horizontal wind turbine is relatively high, and the theoretical limit value can reach nearly 59.3%. The efficiency is close to zero at the center of rotation. Since the diameter of the diversion cover is 50% of the inner diameter of the pipe, the airflow can only flow through the front part of the blade. If the blade is properly designed, the overall efficiency of the wind turbine can reach 45% or even higher. The water volume of 13.5 kg per second enters the pipeline, and the mass per cubic meter is correspondingly increased to 1.5 kg/cubic meter after the atomized water and compressed air are mixed, then the electrical power of the first-level wind turbine is P= (½)*1.5 (air Density)*0.45 (conversion efficiency)*0.75 (effective area)*62.5$^3$ (wind speed)=61,789 watts.

In Example 1, the diameter of the wind turbine impeller is 1.12 meters. When the blade tip speed ratio (the ratio of the blade tip linear speed to the wind speed) is designed to be 5, through calculation, in the first-level wind turbine, the rated speed of the generator is 5329 rpm.

In Example 1, set the wind speed before the first-level wind rotor to V1, and the wind speed after passing through the first-level wind rotor is reduced to V2, then the thrust T acting on the first-level wind rotor is: T=m(V1−V2), m=ρ*S*V, m is the flow quality per unit time.

According to the pressure difference before and after the wind rotor, the thrust acting on the first-stage wind rotor can be expressed as T=S(Pa−Pb), where Pa is the wind pressure before the wind rotor, and Pb is the wind pressure after the wind rotor of the first-level, according to "Bernoulli equation" can be obtained: $1/2\rho V1^2+P1=1/2\rho V^2+Pa$; $(1/2)\rho V2^2+P2= (1/2)\rho V^2+Pb$; V=1/2 (V1+V2); when V=V1(1−a), then, V2=V1(1−2a); wherein V2/V1= (1−2a) is the ratio of the wind speed after the wind turbine to the incoming wind speed; a=(1−V2/V1)/2, here, a is the turbulence factor before and after the wind wheel due to changes in wind speed.

$P(power)=(1/2)*m*V1^2−V2^2)$; $P(power)=2\rho SV1^3*a*(1-a)^2$; as the maximum power of the wind turbine occurs when dp/da=0, that is, $dp/da=2\rho SV1^3(1−4a+3a2)=0$, when a=1/3, that is V2/V1=1/3, Pmax(Max power)=(16/27)*(0.5ρSV1$^3$), ρ=P/0.5ρSV1$^3$, pmax=16/27=0.593, a=(1−V2/V1)/2. When V2/V1 is 1/3, ρ=0.593; when V2/V1 is 1/2, ρ=0.563; when V2/V1 is 2/3, ρ=0.463; when V2/V1 is 7/10, ρ=0.434.

Through the above calculation, it can be known that when the turbine efficiency ρ is 0.45, the wind speed of V2 is around 0.68*V1=0.68*62.5=42.5 m/s.

On the basis of knowing the wind speed of V2, the parameters of the second-level wind turbine can be designed. The impeller diameter of the second-level wind turbine is the same as the first-level which is still 1.12 meters. When the blade tip speed ratio (the ratio of blade tip linear speed and wind speed) is designed to be 5, through the same calculation, the rated RPM of the second-level wind turbine is 3624, and is rated power is 19,431 watts. Compared with the first-level turbine, the rated speed of the turbine is 0.68 of the rated speed of the turbine of the previous level.

In the same way, the effective wind speed of the third-level wind turbine is calculated as 0.68*42.5=28.9 m/s, and the impeller diameter of the third-stage wind turbine is still 1.12 meters. When the blade tip speed ratio (the ratio of blade tip linear speed and wind speed) is designed to be 5, through the same calculation, the rated speed of the third-level wind turbine is 2464 rpm and the rated power is 6109 watts.

The wind speed of the fourth-level wind turbine is 0.68*28.9=19.65 m/s, and the impeller diameter of the fourth-level wind turbine is still 1.12 meters. When the blade tip speed ratio (the ratio of blade tip linear speed and wind speed) is designed to be 5, by the calculation, the rated speed of the fourth-level wind turbine is 1675 rpm and the rated power is 1920 watts.

The wind speed of the fifth-level wind turbine is 0.68*19.65=13.36 m/s, and the impeller diameter of the fourth-level wind turbine is still 1.12 meters. When the blade tip speed ratio (the ratio of blade tip linear speed and wind speed) is designed to be 5, by the calculation, the rated speed of the fourth-level wind turbine is 1139 rpm and the rated power is 604 watts.

The wind speed of the sixth-level wind turbine is 0.68*13.36=9.1 m/s, and the impeller diameter of the fourth-level wind turbine is still 1.12 meters. When the blade tip speed ratio (the ratio of blade tip linear speed and wind speed) is designed to be 5, by the calculation, the rated speed of the fourth-level wind turbine is 776 rpm and the rated power is 190 watts.

The total power generation of the above are: 61789+19431+6109+1920+604+190=90043 watts (90 kw), and low manufacturing cost, reduce much the peak shaving cost.

Example 2

Example 2 is based on Example 1 and in comparison to Example 1, with increase in the size of the diversion cover. When the inner cross-sectional area of the pipeline is the same as in Example 1, and the flow rate of compressed air is also the same, but the maximum diameter of the diversion cover is increased to 60% of the diameter of the inner wall of the pipeline, according to the same calculation method in Example 1, the wind speed of the first-level V1 can be increased to 68 m/s. The electrical power of the first-level wind turbine is P= (1/2)*1.5 (air density)*0.45 (conversion efficiency)*0.64 (effective area)*68$^3$ (wind speed), corresponding to The rated power of the first-level generator is increased to 67,917 watts, and the rated speed is increased to 5,798 rpm, the rated speed of the second-level turbine is 3,942 rpm and the rated power is 21,355 watts, the rated speed of the third-level turbine is 2681 rpm, rated power is 6715 watts; the rated speed of the fourth-level turbine is 1823 rpm, rated power is 2111 watts; rated speed of the fifth-level turbine is 1240 rpm, rated power is 663 watts; rated power of the sixth-stage turbine is 843 rpm, the rated power is 209 watts, and the total power reached 98,972 watts (99 kw), which is nearly 10% higher than that of Example 1.

It can be learned from the above embodiments that the power generation can be increased by increasing the size of the diversion cover, and the power generation can also be increased by applying atomized water.

Example 3

Example 3 enlarges the pipe size and relatively reduces the airflow speed in comparison with Example 1. When the cross-sectional area of the inner wall of the pipeline is doubled to 2 square meters, and the compressed air flow remains unchanged, it is still 50 cubic meters per second, the size of the diversion cover is still 50% of the diameter of the inner wall, and the diameter of the wind turbine rotor can be 1.58 meter. The maximum diameter of the diversion cover is 0.79 meters, and the airflow speed in front of the first-level turbine (V1) is 25 m/s. Since the airflow is the same, the spraying speed of the atomized water is still 13.5 kilograms per second. Due to the diversion cover, the effective area flowing through the wind rotor is reduced by 25%, and the wind speed is increased from 25 m/s to 31.25 m/s, then the power P of the first-level wind turbine is (1/2)*1.5 (gas density)*0.45 (power generation efficiency)*1.5 (effective area)*31.25³=15450 watts, the rated speed is 1889 rpm; the wind speed flowing through the second-level turbine is 0.68*31.25=21.25 m/s, the generator power is 4858 watts and the rated speed is 1284 rpm; the wind speed flowing through the third-level turbine is 0.68*21.25=14.45 m/s, then the generator power is 1527 watts, and the rated speed is 873 rpm; The wind speed of the fourth-level turbine is 0.68*9.83=m/s, the generator power is 480 watts, and the rated speed is 594 rpm; the wind speed flowing through the fifth-level turbine is 0.68*9.83=6.68 m/s, the generator power is 151 watts and the rated speed is 404 rpm; the wind speed flowing through the sixth-level turbine is 0.68*6.68-4.55 m/s, then the generator power is 48 watts and the rated speed is 275 rpm. The total power is 22,513 watts (22.5 kW), which is much lower than example 1, and due to the increased diameter of the pipeline, the larger size of the turbine, and the slower speed of the generator, the cost of the generator has also increased a lot, the total cost of the pipeline power generation device will also be increased much, and the power generation is greatly reduced. The peak shaving cost will be increase much more than Example 1.

Example 4

Example 4 reduces the size of the pipe and relatively increases the airflow speed in comparison with Example 1. When the cross-sectional area of the inner wall of the pipe is 0.5 square meters smaller than Example 1, the flow rate of the compressed air remains unchanged, which is still 50 cubic meters per second, the spraying speed of the atomized water is still 13.5 kg per second, and the size of the diversion cover is still 50% of the diameter of the inner wall, the diameter of the wind turbine rotor can be 0.79 meters, and the maximum diameter of the diversion cover is about 0.4 meters, then the airflow speed in front of the first-level turbine (V1) can reach 125 m/s, and the power P of first-level turbine is:

(1/2)*1.5 (density)*0.45*0.375 (effective area) *1253=247192 watts, the rated speed is 15110 rpm, the wind speed flowing through the second-level turbine (V2) is 0.68*125=85 m/s, the generator power is 77725 watts, the rated speed is 10275 rpm; the wind speed flowing through the third-level turbine is 0.68*85-57.8 m/s, the turbine power is 24439 watts, and the rated speed is 6987 rpm, the wind speed flowing through the fourth-level turbine is 39.3 m/s, the turbine power is 7685 watts, and the rated speed is 4751 rpm, the wind speed through the fifth-level turbine is 26.7 m/s, and the turbine power is 2416 watts, the rated speed 3231 rpm; the wind speed through sixth-level turbine is 18.2 m/s, the turbine power is 760 watts, rated speed 2197 rpm; the wind speed through seventh-level turbine is 12.3 m/s, the generator power is 239 watts, the rated speed is 659 rpm. Finally the total power is greatly increased to 360,456 watts (360.5 kW), which is 4 times higher than Example 1. At the same time, due to the thin pipeline, the size of the wind turbine rotor is reduced, and the speed of the generator is increased, which can greatly reduce the manufacturing cost of the pipeline power generation device, and greatly reduce the cost of peak-shaving power.

Example 5

Example 5 reduces the efficiency of wind turbines in comparison with Example 4. When the turbines efficiency of pipeline is reduced from 45% to 40%, the turbines tip speed ratio is also 5, other conditions are the same as in Example 4, and the wind speed flowing through the turbines at all levels is the same as in Example 4, then the power of the first-level turbine is 219,726 watts, and the rated speed is 15,110 rpm; the second-level wind turbine is 69,089 watts and a rated speed of 10,275 rpm; the third-level wind turbine is 21,724 watts and a rated speed of 6,987 rpm; the power of fourth-level wind turbine is 6830 watts and the rated speed is 4751 rpm; the power of the fifth-level of wind turbine is 2148 watts and the rated speed is 3231 rpm; the power of the sixth-level of wind turbine is 675 watts and the rated speed 2197 rpm; the power of the seventh-level of wind turbine is 212 watts, the rated speed is 659 rpm. The total power is 320,405 watts (320.4 KW), which is about 11% smaller than that of example 4. Reducing the efficiency of wind turbines has relatively little effect on total power generation.

Example 6

Example 6 increases the area of diversion cover in the second-level turbine in comparison with Example 4. Based on Example 4, when the pipeline 1 is variable cross-section, the diameter of the pipeline 1 is relatively reduced after the first-level turbine and the secondary turbine, or the diameter of the pipeline 1 does not decrease, but the area of the diversion cover increases accordingly, then starting from the secondary turbine, the reduction speed of the wind speed will be slowed down, so the rated wind speed of the secondary level turbine will be correspondingly increased, and the power generation will be increased. Assuming that the basic conditions of example 6 are the same as example 4, but the maximum diameter of the diversion cover is increased to 65% of the pipeline diameter from the second-level turbine, reaching 0.514 meters, then the power & RPM of first-level turbine remains at 247,192 watts, and the rated speed is 15,110 rpm; the wind speed after the first-level turbine is the same as in example 4, which is 85 m/s. However, due to the increase in the area of the second-level turbine diversion cover, when the airflow flows through the second-level turbine, the airflow of 85 m/s is forced into a space of 0.2925 square meters, and the flowing speed through the second-level turbine increased from 85 m/s to nearly 108.9 m/s. The calculation method is: (the effective swept area of the previous level turbine/the effective swept area of the second-level turbine)*the wind speed after the previous level turbine. In example 6, the wind speed of the turbine passing through the second-level turbine is (0.375/0.2925)*85, equal to 108.9 m/s, then the generator power of the second-level turbine is 127,492 watts, and the rated speed is increased to 13,163 m/s. The power of the second-level turbine is increased from 77725 watts in example 4 to 127492 watts in example 6, an increase of 49,767 watts, a 64% increase on the original basis, and the RPM is increased from 10,275 to 13,163. In the same way, if the diameters of the shrouds of the subsequent turbines at all levels are increased according to a certain rule, or the section of the pipeline 1 is correspondingly reduced, the power generation of each turbine will increase and the speed will also increase accordingly, but Since the air has viscous, the maximum diameter of the diversion cover cannot be less than 90% of the diameter of the inner wall of the pipe.

Through the combination of the above 6 examples, the present invention shows that it is possible to reduce the diameter of the pipe, use a variable-section pipe, or increase the size of the diversion cover accordingly, or increase the size of the diversion cover step by step according to a certain rule. It can increase peak-shaving power generation and reduce the cost of power generation devices, thereby greatly reducing the cost of peak-shaving electricity.

The present invention combines the characteristics of wind turbine and compressed air for power generation. The present invention discloses a method of utilizing compressed gas for energy storage when electricity consumption is low, passing the compressed gas through a sealed pipeline when electricity consumption peaks, and setting up a multi-level wind turbine in the sealed pipeline according to the decreasing wind speed, and compressing the compressed air. A device converts the kinetic energy of compressed air into electrical energy.

The device of the present invention uses compressed air to set up (N+1)-level wind turbines with the same diameter of wind turbine, but different rated power and rated speed in a pipeline, and passes the high-speed airflow through the multi-levels of wind turbine to reduce the airflow speed. It is a device that converts wind energy into electrical energy and mixes atomized water when the compressed air flows through the wind turbine to improve the power generation efficiency. This device is called a pipeline power generation device and also is a dedicated compressed air turbine. The pipeline power generation device can be used by multiple devices in parallel connecting with each other to increase the total power of peak-shaving power. The purpose of the present invention is to reduce the cost of peak shaving power.

I claim:

1. A device for power storage and electricity generation based compressed air as an energy source, comprising
   a pipeline,
   a pipeline power generator inside the pipeline, wherein the pipeline power generator comprises (N+1)-level horizontal axis wind turbines in the pipeline to generate electricity, and N is an integer of greater than 1 and equal to or less than 8,
   a diversion cover installed at a center of rotation on a windward side of each horizontal axis wind turbine, and a maximum diameter of the diversion cover is between 50%-90% of an inner diameter of the pipeline, and
   a plurality of deflectors being arranged at equal intervals on an inner wall of the pipeline between atomizing nozzles and a first-level horizontal axis wind turbine and between two adjacent ones of the (N+1)-level horizontal axis wind turbines, and the deflectors are perpendicular to a tangent of a circumference of the pipeline.

2. The device of claim 1, wherein the pipeline is a circular equal-section pipeline,
   each horizontal axis wind turbine comprises a wind rotor of a same diameter, and a number of blades in each horizontal axis wind turbine is at least 3 or more, and
   each horizontal axis wind turbine generates power independently.

3. The device of claim 2, wherein a ratio of a rated speed of the horizontal axis wind turbine to a rated speed of a previous level horizontal axis wind turbine is in a range of 3:5 to 9:10.

4. The device of claim 1, wherein the pipeline is a circular variable-section pipeline, the pipeline gradually reduces diameter from the first level horizontal axis wind turbine to an end diameter at another end, wherein the end diameter is equal to or greater than 10% of a diameter of a diversion cover for the (N+1)-level horizontal axis wind turbine, and
   a number of blades in each horizontal axis wind turbine is at least 3 or more, and each horizontal axis wind turbine generates power independently.

5. The device of claim 4, wherein a ratio of a rated speed of the horizontal axis wind turbine to a rated speed of a previous level horizontal axis wind turbine is in a range of 3:5 to 9:10.

6. The device of claim 1, wherein a plurality of shafts of the horizontal axis wind turbines at first-level to (N+1)-level in the pipeline are connected to each other to form a single shaft, the single shaft is fixed by support bodies and pipelines of the horizontal axis wind turbines, and a diversion cover is fixed on the single shaft.

7. The device of claim 1, further comprising
   a valve arranged on the pipeline at an inlet,
   the atomizing nozzles for atomized water arranged on the pipeline at the inlet between the valve and the deflectors of the first-level horizontal axis wind turbine, wherein the atomizing nozzles are evenly distributed around the pipeline, and
   a plurality of outlets at a bottom of the pipeline.

* * * * *